(12) United States Patent
Goel et al.

(10) Patent No.: US 12,342,237 B2
(45) Date of Patent: *Jun. 24, 2025

(54) SYSTEMS AND METHODS FOR REDUCING SLICE ACCESS FAILURES

(71) Applicant: DISH Wireless L.L.C., Englewood, CO (US)

(72) Inventors: Neha Goel, Henderson, VA (US); Siddhartha Chenumolu, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,120

(22) Filed: Jul. 20, 2023

(65) Prior Publication Data

US 2023/0370934 A1    Nov. 16, 2023

Related U.S. Application Data

(63) Continuation of application No. 17/243,674, filed on Apr. 29, 2021, now Pat. No. 11,758,459, which is a continuation of application No. 16/825,321, filed on Mar. 20, 2020, now Pat. No. 11,026,149.

(60) Provisional application No. 62/969,006, filed on Jan. 31, 2020.

(51) Int. Cl.
    *H04W 36/34* (2009.01)
    *H04W 36/00* (2009.01)
    *H04W 36/30* (2009.01)

(52) U.S. Cl.
    CPC ..... *H04W 36/305* (2018.08); *H04W 36/0079* (2018.08); *H04W 36/0085* (2018.08); *H04W 36/34* (2013.01); *H04W 36/13* (2023.05)

(58) Field of Classification Search
    CPC ............ H04W 36/00; H04W 36/0079; H04W 36/00837; H04W 36/0085; H04W 36/03; H04W 36/05; H04W 36/30; H04W 36/305; H04W 36/34; H04W 48/20
    USPC ........................................................ 455/436
    See application file for complete search history.

(56) References Cited

U.S. PATENT DOCUMENTS

| | | | |
|---|---|---|---|
| 2014/0038607 A1* | 2/2014 | Makharia | H04W 76/27 455/436 |
| 2016/0142957 A1* | 5/2016 | Hu | H04W 36/0094 370/331 |
| 2019/0028941 A1* | 1/2019 | Zee | H04W 36/0077 |
| 2019/0327657 A1* | 10/2019 | Han | H04W 48/18 |
| 2020/0205065 A1* | 6/2020 | Wei | H04W 48/16 |
| 2020/0267554 A1* | 8/2020 | Faccin | H04L 63/101 |
| 2021/0250853 A1* | 8/2021 | Corston-Petri | H04W 48/18 |
| 2022/0110050 A1* | 4/2022 | Won | H04W 8/12 |

(Continued)

*Primary Examiner* — Jean A Gelin
(74) *Attorney, Agent, or Firm* — KW Law, LLP

(57) ABSTRACT

Systems, devices, and automated processes for user equipment (UE) to access network slices at cell sites. An example process includes receiving a registration request from the UE. The registration request includes a list of network slices for access at network cells within range of the UE. The UE is authenticated to the network to identify subscription information of the UE. A list of slice identifications (IDs) available to the UE is transmitted to the UE. A slice-specific authentication of the UE is initiated for a slice identified as available based on the subscription information. The UE is allowed to access the slice in response to the slice-specific authentication.

20 Claims, 5 Drawing Sheets

(56) References Cited

U.S. PATENT DOCUMENTS

| | | | |
|---|---|---|---|
| 2023/0232356 A1* | 7/2023 | Johansson | H04W 48/18 455/411 |
| 2024/0114444 A1* | 4/2024 | Foti | H04W 60/005 |

* cited by examiner

SYSTEMS AND METHODS FOR REDUCING SLICE ACCESS FAILURES

CROSS-REFERENCE TO RELATED APPLICATION

This application claims priority to U.S. patent application Ser. No. 17/243,674 filed on Apr. 20, 2021 and entitled "SYSTEMS AND METHODS FOR REDUCING SLICE ACCESS FAILURES;" and to U.S. patent application Ser. No. 16/825,321 filed on Mar. 20, 2020 and issued as U.S. Pat. No. 11,026,149; and to U.S. Provisional Application No. 62/969,006 filed on Jan. 31, 2020, all of which are incorporated herein by reference for any purpose.

TECHNICAL FIELD

The following discussion generally relates to reducing slice access failures in wireless communications systems. More particularly, the following discussion relates to systems, devices, and automated processes that reduce slice access failures in 5G data networks or the like by broadcasting slice identification and offset information that user equipment can process to identify and connect to appropriate slices of the network.

BACKGROUND

Newer 5G data and telephone networks are being developed to provide greatly improved bandwidth and quality of service to mobile telephones, computers, internet-of-things (IoT) devices, and the like. As these newer high-bandwidth networks evolve, however, additional challenges are being recognized. The virtualization of the radio access network (RAN) of next-generation (5G) wireless systems enables applications and services are physically decoupled from devices and network infrastructure. This enables the dynamic deployment of heterogeneous services by different network operators over the same physical infrastructure. RAN slicing utilizes virtualization allows the operator to provide dedicated logical networks with customer specific functionality, without losing the economies of scale of a common infrastructure. When implementing these virtual networks, mobile devices and other user equipment can experience challenges in properly connecting and operating in environments where each network provides different "slices" of bandwidth for different quality of service (QoS). In particular, many user equipment devices are unaware of which "slices" of the network are available from different access cells, thereby leading to difficulties in establishing appropriate connections, and even undesired access failures as certain devices search for network slices that may be unavailable from certain cells of the network.

It is therefore desirable to create systems, devices, and automated processes that can reduce slice access failures and allow mobile devices to operate the desired network slices. It also desirable to improve connectivity for user equipment devices operating within 5G or similar networks.

Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

BRIEF SUMMARY

Figure 1:
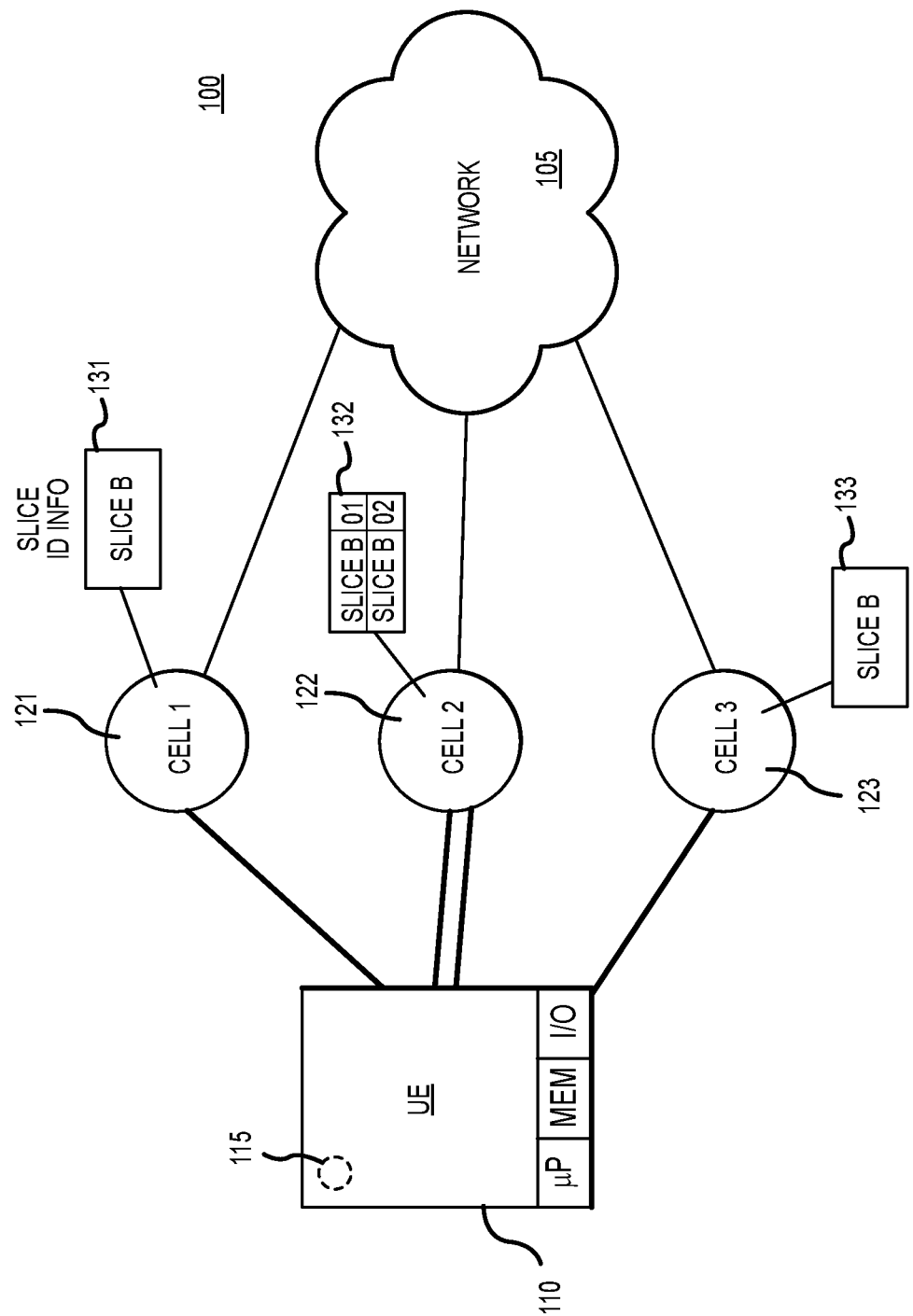
FIG. 1 is a diagram showing a wireless data networking environment in accordance with an embodiment.

Systems, devices, and automated processes are provided to reduce slice access failures and allow mobile devices to operate the desired network slices.

In an embodiment, a method of selective access to multiple available slices of a network from at least one cell by user equipment (UE) to enable reductions in slice failure accesses to the network is provided. The method includes: accessing at a first cell, by the UE, slice A of the network wherein slice A provides higher bandwidth and lower latency access than slice B; and accessing at a second cell, by the UE, both slice A and slice B of the network wherein slice B has greater access availability than slice A; wherein if the UE attempts to access the first or second cell then via cell reselection of the UE making a determination to select the second cell if the user is authorized for use of a premium service for the higher bandwidth and lower latency access of slice A else selecting by the UE the first cell for network access of slice B.

In various exemplary embodiments, the method further includes in an idle mode, camping by the UE at a first cell for reading broadcasted system information for network access at the first cell and for receiving slice IDs which are supported and a slice offset value for available neighboring (n) cells. The method further includes performing measurements by the UE on neighboring cells and calculating cell re-selection criterion using broadcasted slice offsets supported in the Network that corresponds to the slice IDs. The method further includes triggering a re-select of a top-ranking neighboring cell by the UE wherein the UE reselects a new slice B. The method of claim 4, further includes: initiating, by the UE, a protocol data unit (PDU) session with slice A, wherein the PDU session is accepted by the network as the cell B supports slice A and if the UE is camped in an idle mode and in a slice failure, the UE initiating a PDU session with slice A. The method further includes receiving by the UE a rejection of slice access since a gnB or cell fails to support slice A; and triggering a re-selection by the UE of measurements of neighboring cells. The method further includes: performing, by the UE cell ranking for re-selection by determining if a re-selected cell supports slice A and if determined to support slice A then initiating by the UE the PDU session with slice A, if determined not to support slice A then re-select by the UE another cell based on a cell re-select criteria via the reselection of the UE.

In another exemplary embodiment, a computer program product tangibly embodied in a computer-readable storage device and including a set of instructions that when executed by a processor perform a method for selective access to multiple available slices of a network from at least one cell by user equipment (UE) to enable reductions in slice failure accesses to the network is provided. The method includes: accessing at a first cell, by a programmed processor by the set of instructions contained within the UE, slice A of the network wherein slice A provides higher bandwidth and lower latency access than slice B; and accessing at a second cell, by the programmed processor, both slice A and slice B of the network wherein slice B has greater access availability than slice A; wherein if the programmed processor attempts to access the first or second cell then via cell selection instructions of the programmed processor making a determination to select the second cell if the user is authorized for use of a premium service for the higher bandwidth and lower latency access of slice A else selecting by the programmed processor the first cell for network access of slice B.

In various exemplary embodiments, the method further includes in an idle mode, camping as instructed by the programmed processor of the UE at a first cell for reading broadcasted system information for network access at the first cell and for receiving slice IDs which are supported and a slice offset value for available neighboring (n) cells. The method further includes performing measurements as instructed by the programmed processor of the UE on neighboring cells and calculating cell re-selection using broadcasted slice offsets which are supported that correspond to the slice IDs. The method further includes triggering a re-select of a top-ranking neighboring cell by the programmed processor of the UE wherein the programmed processor of the UE reselects a new slice B. The method further includes initiating, as instructed by the programmed processor of the UE, a protocol data unit (PDU) session with slice A, wherein the PDU session is accepted by the network as the cell B supports slice A. The method further includes if the UE is camped in an idle mode and a slice failure, as instructed by the programmed processor of the UE, initiating the PDU session with slice A. The method further including receiving by the programmed processor of the UE a rejection of slice access since a gnB or cell fails to support slice A; and triggering a re-selection as instructed by the programmed processor of the UE of measurements of neighboring (n) cells. The method further including: performing, as instructed by the programmed processor of the UE, a cell ranking of neighboring (n) cells for re-selection by determining if a re-selected cell supports slice A and if determined to support slice A then initiating by the programmed processor of the UE the PDU session with slice A, and if determined not to support slice A then re-selecting by the programmed processor of the UE another cell based on a cell re-select criteria via programmed selection instructions of the programmed processor of the UE.

In yet another exemplary embodiment, a method executed by a user equipment (UE) having a processor, memory, and input/output interfaces, wherein the processor is configured to execute instructions stored in the memory to reduce slice access failures by considering slice identification and slice offset information received from a network node is provided. The method includes accessing multiple available slices of a network from at least one cell by the user equipment (UE) by: accessing at a first cell, by the configured processor contained within the UE that executes the instructions, slice A of the network wherein slice A provides higher bandwidth and lower latency access than slice B; and accessing at a second cell, by the configured processor, both slice A and slice B of the network wherein slice B has greater access availability than slice A; wherein if the configured processor attempts to access the first or second cell via cell selection instructions then making a determination to reselect the second cell if the UE is authorized for use of a premium service for the higher bandwidth and lower latency access of slice A else selecting by the programmed processor the first cell for network access of slice B. The method further including in an idle mode, camping as instructed by the configured processor of the UE at a first cell for reading broadcasted system information for network access at the first cell and for receiving slice IDs which are supported and a slice offset value for available neighboring (n) cells.

In various exemplary embodiments, the method further including performing measurements as instructed by the configured processor of the UE on neighboring cells and calculating cell re-selection using broadcasted slice offsets which are supported that correspond to the slice IDs. The method further including: triggering a re-select of a top-ranking neighboring cell by the configured processor of the UE wherein the configured processor of the UE reselects a new slice B; and initiating, as instructed by the configured processor of the UE, a protocol data unit (PDU) session with slice A, wherein the PDU session is accepted by the network as the cell B supports slice A.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Various embodiments are able to improve connectivity within a 5G network or the like by broadcasting, from each cell, identification information about the various slices of bandwidth that are available from that cell. When user equipment devices are made aware of available slices, more effective and efficient connections can be made.

The Access and Mobility Management Function (AMF) instance that is serving the UE is common (or logically belongs) to all the Network Slice instances that are serving the UE. Other network functions, such as the Session Management Function (SMF) or the User Plan Function (UPF), may be specific to each Network Slice. The Network Slice instance selection for a UE is normally triggered as part of the registration procedure by the first AMF that receives the registration request from the UE. The AMF retrieves the slices that are allowed by the user subscription and interacts with the Network Slice Selection Function (NSSF) to select the appropriate Network Slice instance (e.g., based on allowed S-NSSAIs, PLMN ID, etc.).

A Protocol Data Unit (PDU) Session is associated with one S-NSSAI and one DNN (Data Network Name). The establishment of a PDU session within the selected instances-NSSAI is triggered when the AMF receives a Session Management message from UE. The AMF discovers candidate Session Management Functions (SMF) using multiple parameters including the S-NSSAI provided in the UE request and selects the appropriate SMF. The selection of the User Plane Function (UPF) is performed by the SMF and uses the S-NSSAI. The Network Repository Function (NRF) is used for the discovery of the required Network Functions using the selected Network Slice instance—the detailed procedures are specified in 3GPP TS 23.502. The data transmission can take place after a PDU session to a Data Network is established in a Network Slice.

A physical or network node either represents an access node (e.g. Radio Distributed Units) or a non-access node (e.g. servers and routers) while a physical link represents an optical fiber link between two physical nodes. Every physical node is characterized by a set of available resources, namely computation (CPU), memory (RAM), and storage. Each physical link is characterized by a bandwidth capacity and a latency value which is the time needed by a flow to traverse that link. Finally, both physical nodes and links have associated utilization costs for each type of available resource.

In addition, we consider a set of network slice requests that correspond to customer demands to implement specific Communication Services. A network slice is a virtual network composed of a set of virtual nodes interconnected by a set of virtual links.

Network Slicing

A network slice, namely "5G slice", supports the communication service of a connection type with a specific way of handling the C- and U-plane for this service. To this end, a 5G slice is composed of a collection of 5G network functions and specific RAT settings that are combined for the specific use case or business model. Thus, a 5G slice can span all domains of the network: software modules running on cloud nodes, specific configurations of the transport network supporting the flexible location of functions, a dedicated radio configuration, or even a specific RAT, as well as the configuration of the 5G device. Third-party entities can be given permission to control certain aspects of slicing via a suitable API, in order to provide tailored services.

In an example scenario, a slice ("Slice A") is instantiated with a distributed centralized unit (CU), multi-access edge computing (MEC), and user plane function (UPF) for low latency and content caching. In this example, Slice A is dedicated to enterprise users, commercial users, and/or the like who have paid for a premium service. That is, users of Slice A can expect better bandwidth, lower latency, better access to edge computing resources, and/or other benefits than non-preferred users. A more general slice ("Slice B" in this example) will typically provide better geographic coverage than the premium slice A, but without the performance benefits of Slice A. Generally, Slice B will be made available to all users of the system, including non-preferred users. Ideally, Slice B would also be available for use by premium users when no Slice A is available. That is, premium users will often have access to Slice B (albeit without the performance benefits provided by Slice A) when Slice A is not available. This provides premium users with access to the same geographic coverage as non-premium users while retaining the premium services where Slice A is available. From a network standpoint, then, the network will generally have mixed deployments where i) some cells supporting slice A are on different frequencies than Slice B macro/public cells and ii) some cells will be supporting both slice A and B. User devices operated by those users that have paid for a premium service would ideally prioritize cells that support the higher priority slice, but fall back to other cells when the higher priority slice is not available.

Presently, user equipment (UE) does not typically select and access cells based upon the slices that are supported by the Network. That is, even if the premium users have access to both normal neighboring (n) or macrocells and low latency cells, their UEs will not generally distinguish between these cells and will reselect based on other cell ranking criterion (e.g., received signal strength (RSSI) or other parameters related to the strength of the signal received from the cell). If a premium user is camped on a macro cell that does not offer slice A, for example, that user's UE will frequently reject the UE's attempt to access Slice A, even if the slice is available on another cell. Generally speaking, network providers rely upon the UE implementation to reselect to another cell and to initiate an attempt to access slice B. The subsequent reselections will not typically take slicing into account, and as a result, the UE may reselect cells that do not offer slice A, even if other cells offering the premium slice are available (albeit potentially at a less optimal cell according to other criteria).

To overcome this problem, each network node (e.g., gNB) should periodically or otherwise broadcast slice IDs that are supported by that node, along with a slice offset value for each slice ID that the UE can take into account while performing the cell ranking criterion for re-selection. Additionally, if a UE that is camped on a cell receives a rejection to access a slice not supported by the Network, that UE can trigger reselection using the slice IDs and slice offset value.

In various exemplary embodiments, the present disclosure describes methods and systems enabling enterprise and public users access to cells based on the slices supported by the network (i.e. 5G network). So if the premium users have access to normal neighboring (n) cells and low latency cells, the UEs will not distinguish between these cells and will reselect based on the cell ranking criterion.

In various exemplary embodiments, the present disclosure describes methods and systems for providing premium users when camped on a macro cell that does not offer slice A will reject the UE's attempt to access Slice A. It would be then based on UE implementation to reselect to another cell and initiate attempts to access slice B. The subsequent reselections will also not take slicing into account and UE may reselect cells that do not offer slice A.

FIG. 1 shows a graphical representation of a 5G or other data network 100 that includes multiple cells 121, 122, 123 that provide access to a network 105 for any number of UE devices 110. Although FIG. 1 shows only one UE device 110 for simplicity, in practice the concepts described herein may be scaled to support environments 100 that include any number of devices 110 and/or cells 121-123, as well as any sort of network architecture for assigning bandwidth to the different slices and performing other tasks, as desired.

In the example of FIG. 1, a mobile telephone or other user equipment (UE) device 110 suitably attempts to connect to network 105 via an appropriate access cell 121, 122, 123. In the illustrated example, each cell 121, 122, 123 maintains identification information 131, 132, 133 (respectively) that identifies the various slices of bandwidth (Slice A, Slice B) that are available from that cell. In various embodiments, information 131-133 additionally includes offset values or other information that can be used in selecting and connecting to an appropriate cell 131-133, as desired.

As illustrated in FIG. 1, cell 121 provides access to slice B, cell 122 provides access to slices A and B, and cell 123 provides access to slice B. As user device 110 attempts to select a cell 121-123 to connect to, cell selection logic 115 executed by the device is able to consider the different slices that are available from the different cells, as described more fully below. In an example embodiment, cell selection logic 115 is implemented with computer-executable instructions stored in a memory, hard drive, or other non-transitory storage of device 110 for execution by a processor of device 110.

If a user of device 110 is authorized to use preferred slice A as in the example above, device 110 should ideally select cell 122 of the available cells 121-123 since this is the only cell that provides the premier service. As noted above, more conventional current implementations simply consider received signal strength and/or the like in selecting between available cells. By broadcasting the slice availability data 131-133, the cell selection logic 115 of user device 110 can make a more informed selection that is more likely to provide better service when it is available.

Figure 2:
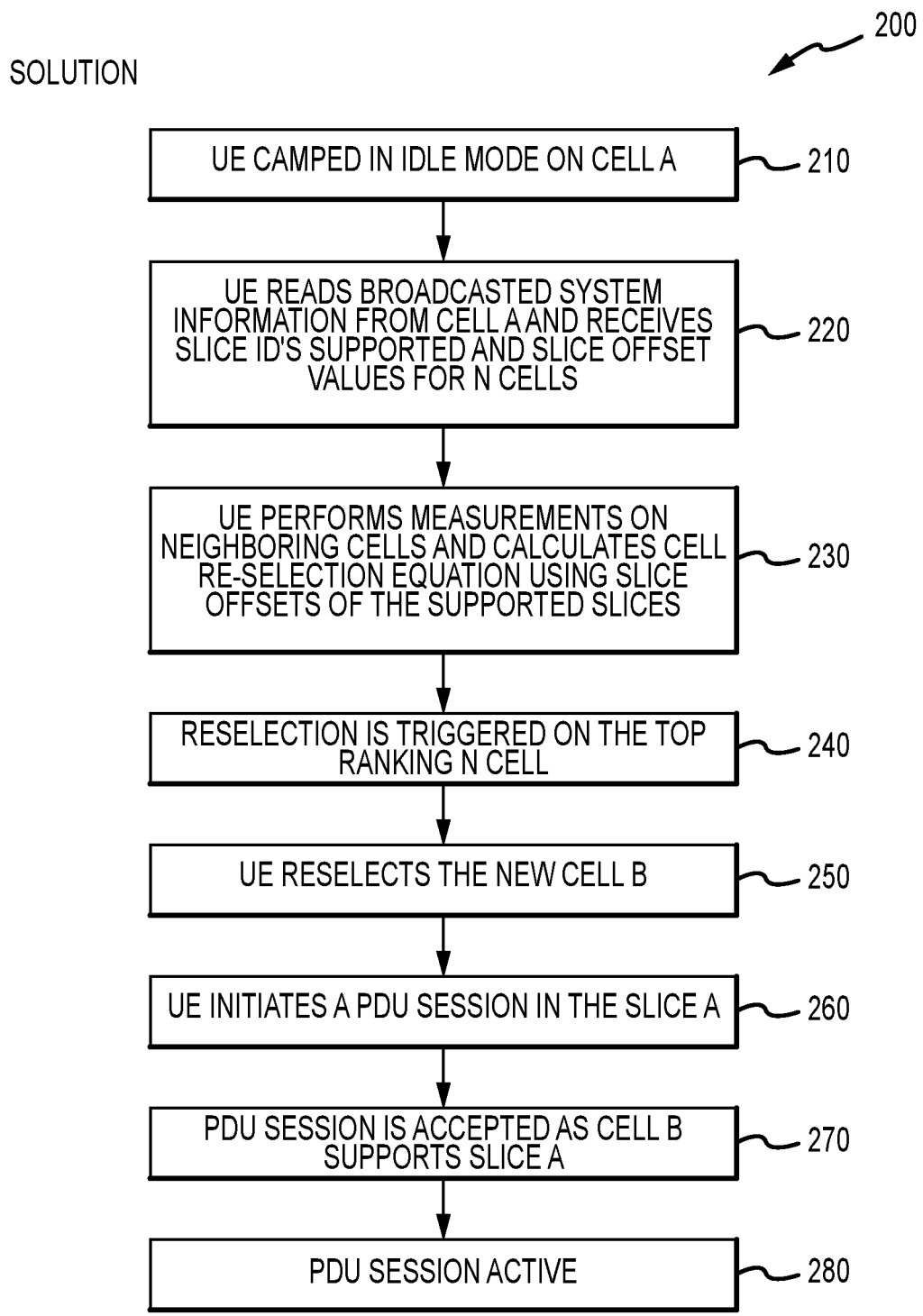
FIG. 2 is a flowchart of an example automated selection process for reducing slice access failures in accordance with an embodiment.

FIG. 2 is an exemplary flowchart 200 of cell reselection for slice access performed by the UE in accordance with an embodiment. In FIG. 2, the UE is camped in an idle mode on cell A at 210. Next, at 220, the UE reads a broadcasted system information from cell A (i.e. the current cell in which the UE is located) and receives slice IDs supported by cell A and slice offset values for neighboring (n) cells. At 230, the UE performs measurements on neighboring cells and calculates cell reselection equations using slice offsets of the supported slices. That is, the UE creates a measurement report of slices A, B, etc. . . . provided to the UE. At 240, a reselection is triggered on the top-ranking n cells. At 250, the UE reselects the new cell B based on the ranking of the n cells. The UE, at 260 initiates the PDU session with slice A. At 270, the session is accepted as call B supports slice A. At 280, the PDU session is active.

Figure 3:
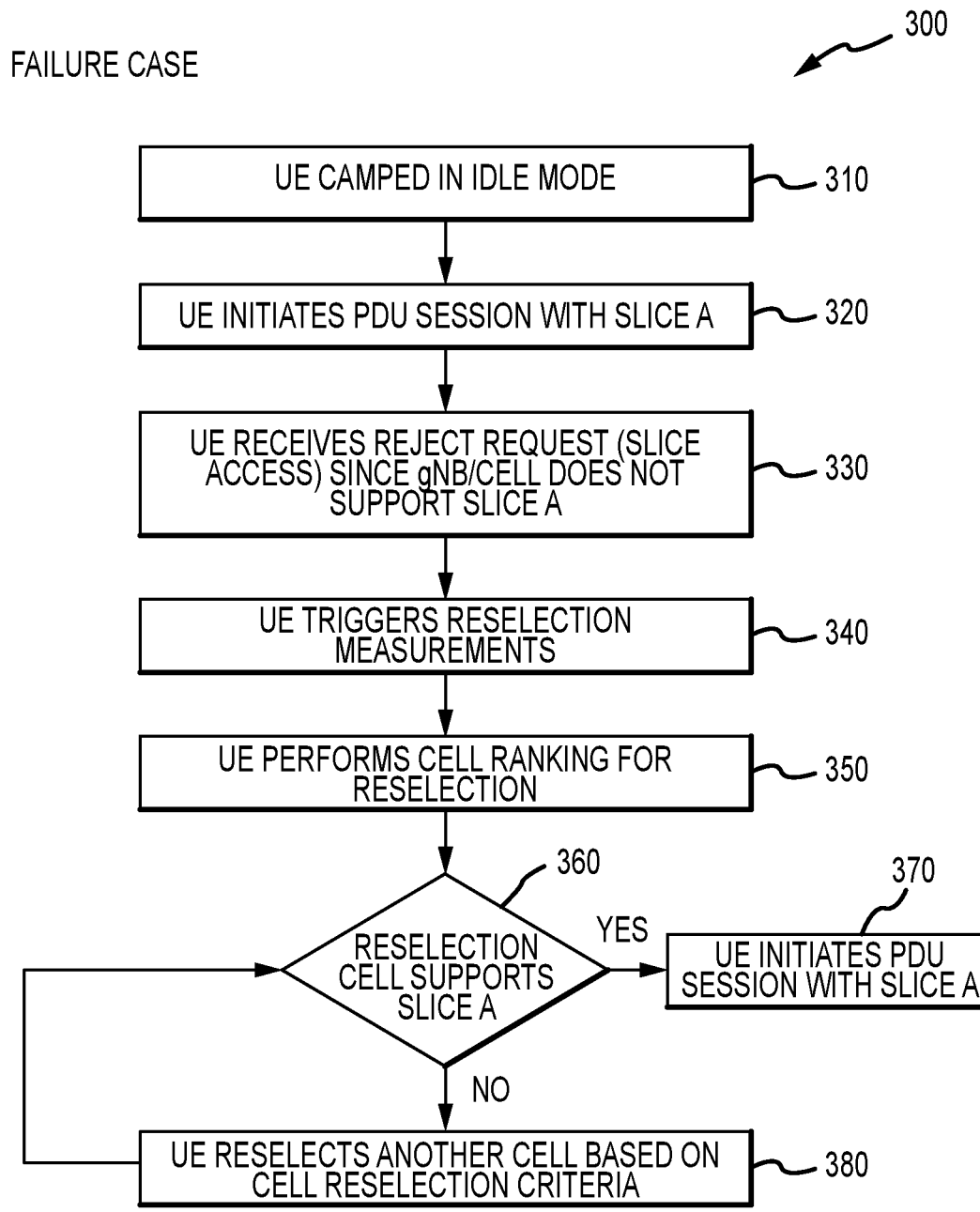
FIG. 3 is a flowchart of an example of the failure case selection process for reducing slice access failures in accordance with an embodiment.

FIG. 3 is an exemplary flowchart 300 of failure cases for slice access performed by the UE in accordance with an embodiment. In FIG. 3, the UE is camped in an idle mode at 310. At 320, the UE initiates a PDU session with slice A. At 330, the UE receives a reject (slice access) since the gnB/cell does not support slice A. At 340, the UE triggers a reselection measurement of neighboring cells. At 350, UE performs a cell ranking based on the measurements of the neighboring cells. At 360, the UE reselects a cell that supports slice A, if confirmed then at 370, the UE initiates a PDU session with slice A. If not, then at 380, the UE reselects another cell based on the cell reselection criteria. This continues until a cell is found that supports slice A or all the cells in the cell list are exhausted.

Figure 4:
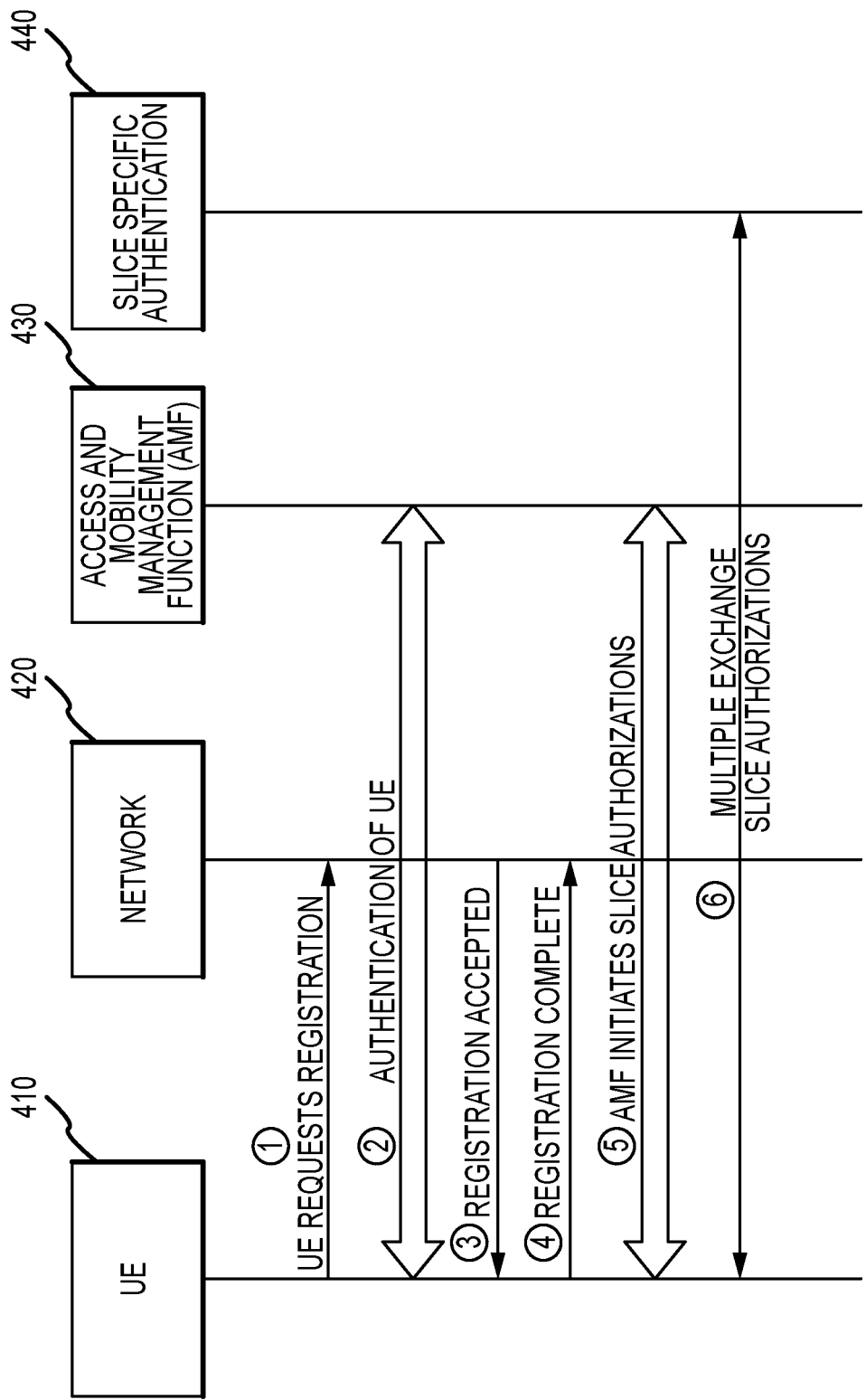
FIG. 4 is a diagram of an example automated registration process of user equipment (UE) to a network for slice access authentication in accordance with an embodiment.

FIG. 4 is a registration process for a slice at a cell by the UE in accordance with an embodiment. At Step 1, the UE 410 sends a Registration Request to the network. The UE 410 will include the list of neighboring cells corresponding to the network slices for authentication access. At step 2, the UE 410 and network 420 complete the authentication of the UE 410, using a particular authentication procedure. After receiving the authentication, the access and mobility management function (AMF) 430 will have a list of allowed slice IDs for the UE 410 in the AMF form based on the subscription information available. At step 3: At the end of the authentication procedure, the AMF 430 sends a Registration Accept message to the UE 410. Based on the subscription information received, the message will contain all the allowed slice access except the ones which require Slice-specific authentication 440. At step 4: the UE 410 sends a Registration Accept message, indicating the successful completion of the authentication. If the UE 410 had indicated its support for Network Slice-Specific Authentication and Authorization Procedure 440 in the Registration Request, based on the subscription information, the AMF 430 initiates slice-specific authentication, for all the slices which require slice specific authentication 440. At step 6, multiple exchanges for slice authorization where the AMF 430 records the success of the authentication requests for the Slice represented and forwards the success to the UE 410. The AMF 440 completes the Slice-specific authentication for all network slices for which there is a subscription indication that a slice-specific authentication is required for the UE to access these slices. Additionally, various implementation can be further included such as once the Slice-Specific Authentication is completed for available slices, depending on the result of Slice-Specific Authentication, the AMF 430 may trigger a UE Configuration Update procedure to deliver a new list of Allowed slices.

Figure 5:
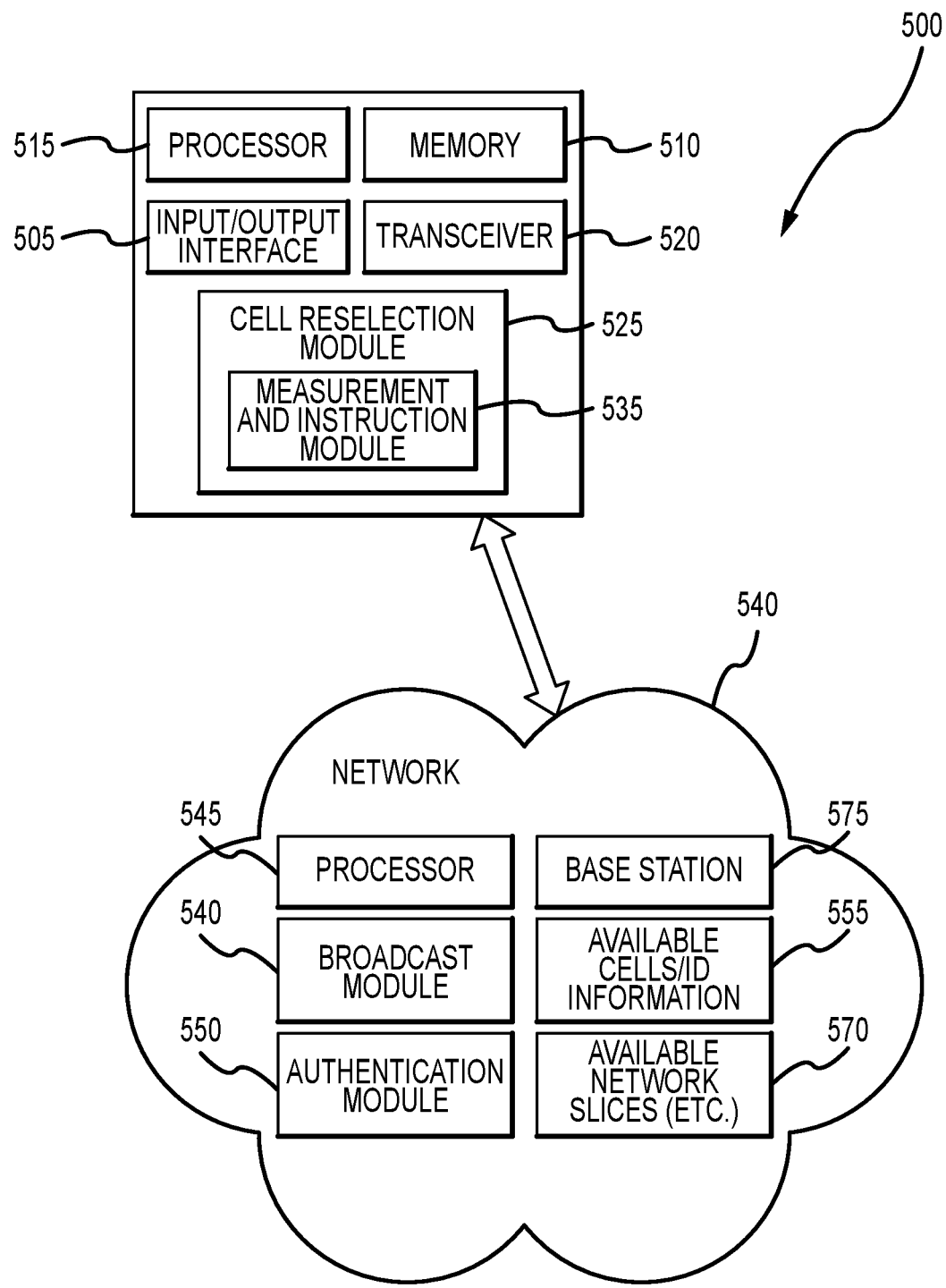
FIG. 5 is a diagram of an example UE and network architecture for an example automated process for reducing slice access failure in accordance with an embodiment.

FIG. 5 is an exemplary illustration of a UE and network configuration 500 in accordance with an embodiment. The UE 510 includes a processor 515 for performing various logic solution functions for registering and receiving broadcast system information, initiating PDU sessions performing cell selections and reselections, ranking neighboring cells, configuring different modes of operation of the UE, etc. . . . . The UE 510 may include cell reselection module 525, input/output interfaces 505, memory 530 for storing measurement reports, rankings data of neighboring cells, and a measurement module 535 (within the cell reselection module 525) for calculating by various solutions distances and other criteria for neighboring cells, etc. The network 540 may include a base station 575, processor 545 for registering UE for slice access, cell ID modules 555, broadcast module 560 for broadcasting slice ID, slice offset values for neighboring cells and other system information, authentication module 550 for authenticating a UE, network slices 570, etc. The UE 510 communicates with the network and reads broadcasted system information at a cell in which the UE is camped in an idle mode. For example, if the UE is camped at a cell A, then the UE would receive slice IDs and slice offset values for neighboring cells of cell A via the transceiver 520 and process the information via the processor 515 to perform measurements and calculate using cell reselection equations of the cell reselection module 525 (e.g. using a cell reselection logic or process) to select a next cell where the cell reselection process is based on a ranking of the neighboring cells.

As described, a data networking system includes several data processing components, each of which is patentable, and/or have patentable aspects, and/or having processing hardware capable of performing automated processes that are patentable. This document is not intended to limit the scope of any claims or inventions in any way, and the various components and aspects of the system described herein may be separately implemented apart from the other aspects.

What is claimed is:

1. A process comprising:
   receiving a registration request from a user equipment (UE), the registration request comprising a list of network slices for access at network cells within range of the UE;
   authenticating the UE to the network to identify subscription information of the UE;
   transmitting to the UE a list of slice identifications (IDs) available to the UE;
   initiating a slice-specific authentication of the UE for a slice identified as available based on the subscription information; and
   allowing the UE to access the slice in response to the slice-specific authentication, wherein the UE ranks the network cells within range and supporting the slice based on a performance measurement of the network cells taken by the UE, wherein the UE selects a network cell from the network cells in response to the network cell having a top rank.

2. The process of claim 1, wherein the list of the slice IDs transmitted to the UE a registration are included in an accept message.

3. The process of claim 1, further comprising initiating the slice-specific authentication for the slice in response to a request from the UE for access to the slice.

4. The process of claim 1, further comprising authenticating the UE for a plurality of restricted slices using the slice-specific authentication in response to an indication in the subscription information of the UE.

5. The process of claim 4, further comprising triggering a configuration update on the UE to deliver a new list of the slice IDs corresponding to available slices, wherein the new list of the slice IDs includes the restricted slices in response to authenticating the UE for the restricted slices.

6. The process of claim 1, further comprising forwarding an authentication success to the UE for the slice in response to the slice-specific authentication of the UE for the slice succeeding.

7. The process of claim 1, wherein a network function authenticates the UE to the network to identify associated subscription information, wherein the network function comprises an Access and Mobility Management Function (AMF).

8. A method comprising:
   camping, by a user equipment (UE), on a first cell, wherein the first cell is configured to broadcast slice identifications (IDs) supported by the first cell and offset values for slices supported by neighboring cells;
   attempting, by the UE, to access a slice on the first cell;
   receiving, by the UE, a slice rejection from the first cell in response to the slice being unsupported by the first cell;
   ranking, by the UE, network cells within range and supporting the slice based on a performance measurement of the network cells taken by the UE; and
   selecting, by the UE, a second cell from the neighboring cells in response to receiving the slice rejection and based on the second cell having a top ranking of the neighboring cells.

9. The method of claim 8, wherein selecting the second cell comprises ranking the neighboring cells based on support for the slice and the offset values.

10. The method of claim 8, further comprising initiating a protocol data unit (PDU) with the second cell using the slice in response to selecting the second cell.

11. The method of claim 8, wherein selecting the second cell comprises:
   performing a measurement on the neighboring cells; and
   calculating cell reselection using the measurement and the slice offsets broadcast by the first cell.

12. The method of claim 8, further comprising performing, by a network function, a slice-specific authentication of the UE for the slice, wherein the network function comprises an access and mobility management function (AMF).

13. The method of claim 12, wherein the AMF allows the UE to access the slice at the second cell in response to the slice-specific authentication succeeding.

14. The method of claim 12, wherein the AMF forwards an authentication success to the UE for the slice in response to the slice-specific authentication of the UE for the slice succeeding.

15. A user equipment (UE) comprising a processor in communication with a non-tangible storage medium configured to store instructions that, when executed by the processor, cause the UE to perform operations, the operations comprising:
   camping on a first cell, wherein the first cell is configured to broadcast slice identifications (IDs) supported by the first cell and offset values for slices supported by neighboring cells;
   attempting to access a slice on the first cell;
   receiving a slice rejection from the first cell in response to the slice being unsupported by the first cell;
   ranking, by the UE, network cells within range and supporting the slice based on a performance measurement of the network cells taken by the UE; and
   selecting a second cell from the neighboring cells in response to receiving the slice rejection and based on the second cell having a top ranking of the neighboring cells.

16. The UE of claim 15, wherein selecting the second cell comprises ranking the neighboring cells based on support for the slice and the offset values.

17. The UE of claim 15, wherein the operations further comprise initiating a protocol data unit (PDU) with the second cell using the slice in response to selecting the second cell.

18. The UE of claim 15, wherein the operations further comprise:
   performing a measurement on the neighboring cells; and
   calculating cell reselection using the measurement and the slice offsets broadcast by the first cell.

19. The UE of claim 15, wherein a network function performs a slice-specific authentication of the UE for the slice, wherein the network function comprises an access and mobility management function (AMF).

20. The UE of claim 19, wherein the AMF allows the UE to access the slice at the second cell in response to the slice-specific authentication succeeding.

* * * * *